United States Patent
Duits et al.

(10) Patent No.: US 8,286,519 B2
(45) Date of Patent: Oct. 16, 2012

(54) LINEAR ACTUATOR

(75) Inventors: Johannes Andrianus Maria Duits, Bodegraven (NL); Martin Voegelin, Hoelstein (CH)

(73) Assignee: Aktiebolaget SKF, Göteborg (SE)

( * ) Notice: Subject to any disclaimer, the term of this patent is extended or adjusted under 35 U.S.C. 154(b) by 185 days.

(21) Appl. No.: 12/452,965

(22) PCT Filed: Aug. 1, 2007

(86) PCT No.: PCT/EP2007/006808
§ 371 (c)(1),
(2), (4) Date: Apr. 19, 2010

(87) PCT Pub. No.: WO2009/015675
PCT Pub. Date: Feb. 5, 2009

(65) Prior Publication Data
US 2010/0192713 A1 Aug. 5, 2010

(51) Int. Cl.
F16H 3/06 (2006.01)
F16H 27/02 (2006.01)
F16H 29/02 (2006.01)
F16H 29/20 (2006.01)
F16B 7/00 (2006.01)
F16B 12/36 (2006.01)
F16B 13/00 (2006.01)

(52) U.S. Cl. .................. 74/89.23; 74/424.79; 403/296; 403/307

(58) Field of Classification Search .............. 74/424.71, 74/424.79, 89.23; 403/292, 293, 296, 307
See application file for complete search history.

(56) References Cited

U.S. PATENT DOCUMENTS

| | | | | |
|---|---|---|---|---|
| 599,492 A * | 2/1898 | Carter | ............. | 285/382 |
| 622,792 A * | 4/1899 | Bates | ............. | 187/408 |
| 1,099,224 A * | 6/1914 | Wenslick | ............. | 74/424.79 |
| 1,123,731 A * | 1/1915 | Griffith | ............. | 74/424.79 |
| 1,195,018 A * | 8/1916 | Holt et al. | ............. | 74/424.79 |

(Continued)

FOREIGN PATENT DOCUMENTS
CN 1388021 A 1/2003
(Continued)

*Primary Examiner* — Justin Krause
*Assistant Examiner* — Gregory Prather
(74) *Attorney, Agent, or Firm* — Mark A. Ussai; Bryan Peckjian (57) ABSTRACT

Linear actuator device, comprising a housing (2), an externally threaded screw (5), a piston (9) and an internally threaded extended nut (7), where the extended nut (7) comprises a plurality of longitudinal segments (40) having longitudinal edges (39) parallel to a center axis (18) of the internally threaded nut (7), where each segment (40) has an identical radius of curvature and an angle of curvature of less than 360°, so that the circumference of the internally threaded nut (7) is formed by at least two segments (40). One advantage of the invention is that linear actuators of different lengths can be manufactured in an easy and cost-effective manner.

23 Claims, 4 Drawing Sheets

U.S. PATENT DOCUMENTS

| | | | | |
|---|---|---|---|---|
| 1,366,096 | A | * | 1/1921 | Perry ................................ 74/841 |
| 2,214,440 | A | * | 9/1940 | Rothery ...................... 254/93 H |
| 2,791,129 | A | * | 5/1957 | Russell ............................ 74/441 |
| 3,266,827 | A | * | 8/1966 | Whicker .......................... 403/24 |
| 3,799,292 | A | * | 3/1974 | Katz ............................ 187/267 |
| 5,704,249 | A | | 1/1998 | Krauska |
| 6,672,540 | B1 | * | 1/2004 | Shaheen et al. ............... 244/99.3 |
| 6,709,187 | B2 | * | 3/2004 | Loh ................................ 403/298 |
| 6,718,694 | B2 | | 4/2004 | Stojc et al. |
| 6,773,198 | B2 | * | 8/2004 | Copping ........................ 403/313 |
| 6,840,702 | B2 | * | 1/2005 | Ko ................................ 403/292 |
| 8,006,817 | B2 | * | 8/2011 | Hanna et al. ................... 188/300 |
| 2002/0194783 | A1 | * | 12/2002 | Stojc et al. ....................... 49/118 |

FOREIGN PATENT DOCUMENTS

| | | |
|---|---|---|
| DE | 202007001801 U1 | 4/2007 |
| EP | 1277990 A2 | 1/2003 |

* cited by examiner

LINEAR ACTUATOR

TECHNICAL FIELD

The present invention relates to an internally threaded tube suitable for use in a linear actuator.

BACKGROUND ART

Linear actuators are used to move an object along a straight line, either between two end points or to a defined position. Actuators may be air or hydraulic driven using pressure or they may be driven by electricity. Air or hydraulic driven actuators are cheap and simple in design. They are also easy to control, but they require an air or hydraulic supply which is relatively expensive, especially for small systems.

Electrically driven linear actuators normally incorporate a rotating motor and some kind of transmission means to convert the relatively high-speed rotating motor to a low speed linear motion. This transmission means may incorporate a gear box and/or a screw shaft. One common type of linear actuator incorporates a screw shaft with a nut running thereon. The screw shaft extends over the full length of the actuator and sets the operating length of the actuator. Since the nut is held in a non-rotatable state, the nut will be displaced when the screw shaft is rotated by a motor. The nut may incorporate rolling elements, such as balls or rollers, between the screw shaft and the nut. This will allow for a high efficiency actuator with high load transfer and long life. The nut may also engage directly with the screw shaft, i.e. a sliding screw design. In this case, the nut is preferably made of a plastic material.

One disadvantage of using a plastic nut is the relatively short life of the nut, due to wear caused by friction between the nut and the screw shaft. The nut should be as short as possible in order to reduce friction and to allow for a long operating range. On the other hand, the nut must be long enough to take up the applied forces. Even though this type of actuator is relatively cheap and well adapted for low and medium load cases, there is still room for improvements.

DISCLOSURE OF INVENTION

An object of the invention is therefore to provide an improved linear actuator which is easy and cost-effective to produce. A further object of the invention is to provide a linear actuator with reduced wear. Another object of the invention is to provide a permanently lubricated linear actuator. An object of the invention is also to provide an improved internally threaded tube for the use in a linear actuator according to the invention.

For an internally threaded tube, the object of the invention is achieved in that the internally threaded tube comprises a plurality of longitudinal segments having longitudinal edges parallel to the centre axis of the internally threaded tube, where each segment has an identical radius of curvature and an angle of curvature of less than 360 degrees, so that the circumference of the internally threaded tube is formed by at least two segments.

By this first embodiment of the internally threaded tube according to the invention, an internally threaded tube comprising a plurality of segments is provided. This is advantageous in that an internally threaded tube can be obtained in an easy way.

In an advantageous development of the invention, the internally threaded tube comprises two semi-circular segments with an internally threaded surface. The advantage of this is that each segment can be produced in an easy and cost-effective way by moulding, using relatively simple tools consisting of only two pieces. The internally threaded tube is assembled from the segments, resulting in an internally threaded tube that can be used for an improved linear actuator. By making the segments symmetrical, the same tool can be used for the production of all the segments, thereby reducing tooling costs.

In an advantageous development of the invention, the internally threaded tube comprises a plurality of segments assembled side by side. By also assembling segments in the longitudinal direction, an internally threaded tube of any desired length can be obtained using only one kind of segments.

In an advantageous development of the invention, the internally threaded tube comprises a plurality of segments that are assembled with a longitudinal displacement of the segments, so that an end portion of one segment is positioned at a mid portion of another segment. By using positioning means, an internally threaded tube of any desired length can be obtained, where the segments are self-locking in the longitudinal direction.

With a linear actuator device, comprising a housing, an externally threaded screw, a piston, and an internally threaded extended nut, the object of the invention is achieved in that the extended nut comprises an internally threaded tube comprising a plurality of segments.

By this first embodiment of the linear actuator device according to the invention, a linear actuator comprising a plurality of internally threaded tube segments is provided. This is advantageous in that linear actuators of different lengths can be obtained in an easy and cost-effective way.

In an advantageous development of the invention, the internally threaded tube comprises a supporting sleeve. This allows for an improved linear actuator with an extended nut that is light and easy to produce.

In an advantageous development of the invention, the extended nut comprises end caps. The advantage of this is that a permanently lubricated linear actuator may be obtained. The linear actuator is further improved using sealing elements in the end caps.

In another advantageous development of the invention, the end caps, and thus the extended nut, are mounted in bearing means supported in the linear actuator housing. The advantage of this is that an improved life and reduced friction is obtained.

In an advantageous further development of the invention, the internally threaded tube comprises at least one internal or external longitudinal groove. This is advantageous in that a pressure build up inside the extended nut is prevented. This is especially advantageous when the internally threaded tube is provided with a lubricant.

In an advantageous further development of the invention, the extended nut is connected to an electrical motor. This is advantageous in that an electric motor is easy to control by an electronic control unit.

In an advantageous further development of the invention, the electrical motor is integrated with the extended nut. This is advantageous in that a compact linear actuator is possible to obtain.

In an advantageous further development of the invention, the linear actuator device comprises a rotational sensor for measuring the rotations of the extended nut. This is advantageous in that the linear actuator can be controlled in an improved way by an electronic control unit.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
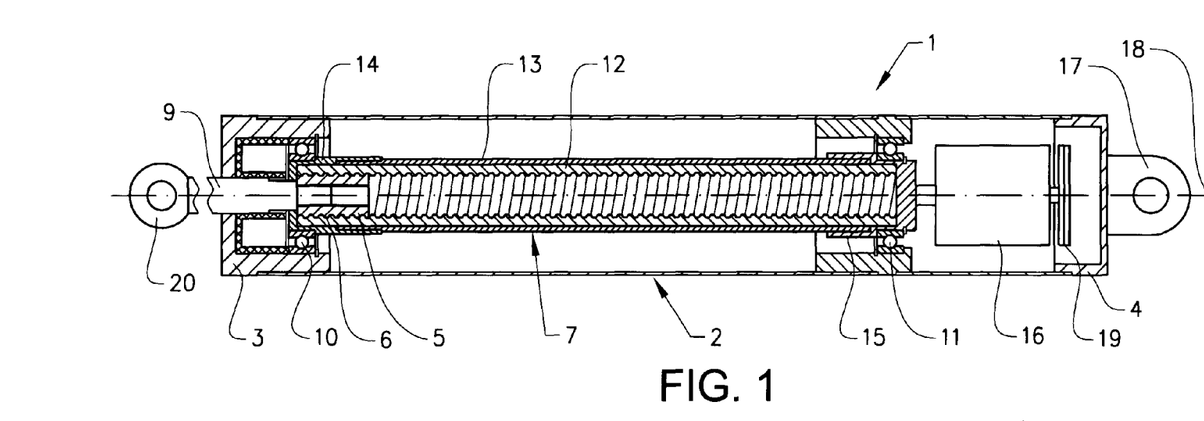
FIG. 1 shows a first embodiment in cut view of a linear actuator according to the invention.

FIG. 1 shows a first embodiment of a linear actuator device according to the invention. The linear actuator 1 comprises a housing 2 with a front end part 3 and a rear end part 4. Inside the housing, a screw 5 having an external thread 6 runs in an extended nut 7 having an internal thread. The housing 2 of the linear actuator 1 is symmetrical around a centre axis 18. A piston rod 9 is at its inner end fixedly attached to the screw. The piston rod 9 is provided with a front attachment means 20, e.g. a hole, a thread, a fork ear or a single ear, at its outer end. The extended nut 7 comprises an internally threaded tube 12, an outer support sleeve 13, a first end cap 14 and a second end cap 15. The extended nut is mounted to the housing in a rotatable way by means of a front bearing device 10 and a rear bearing device 11. In this embodiment, roller bearings are used as bearing devices to obtain a long service life and a reliable function. Other bearing devices may be used, depending on e.g. required durability and precision. The front bearing device 10 is mounted to the first end cap 14 of the extended nut and the rear bearing device 11 is mounted to the second end cap 15 of the extended nut. In this way, the extended nut can rotate freely inside the housing.

When the linear actuator is to be used, it will be mounted to a rigid member, e.g. the chassis of a machine, using a rear attachment means 17, e.g. a fork ear or a single ear. The part to be actuated is mounted to the front attachment means 20 on the piston rod in a non-rotatable way. This means that the piston rod will not be able to rotate around the centre axis of the linear actuator. Since the piston rod will not rotate, the screw will be driven along the extended nut when the extended nut rotates. In this way, the piston rod will extend out of or retract into the housing, depending on the rotational direction of the extended nut.

The screw 5 in this example is a friction screw with an external thread. The length of the screw depends on e.g. the load that the linear actuator is designed for. A longer screw will be able to transfer a larger load to the internally threaded tube, but will also exhibit a larger friction. In a further embodiment, the screw may also be of an external ball or roller screw type. By using one of these screw types, the friction between the screw and the extended nut will be reduced.

In order to facilitate the operation of the linear actuator, the extended nut is driven by an electric motor 16. The motor is in the first embodiment attached in a non-rotatable way to the rear end, i.e. to the second end cap 15, of the extended nut. The mechanical motor connection may also be integrated with the second end cap 15. The operating speed of the piston rod, and thus of the linear actuator, will depend of the speed of the motor and the pitch of the thread. The motor may in this embodiment be any suitable motor, such as a DC-motor, an AC-motor or a stepper motor.

The motor is controlled by an external control unit. The control unit may be any kind of suitable control unit, such as an analogue or digital control unit. The linear actuator may have a standard PLC compatible I/O-interface using discrete signal lines or may have an integrated standard fieldbus interface. Most commonly, a standard PLC compatible I/O-interface will be used for the communication between the motor and the control unit may. Two signal lines can be used for the commands "actuator out" and "actuator in". These signals may be either low-level, when a separate power connection is provided, or high level, when the signals are used to drive the motor directly. This input signal may also comprise information of the motor speed, i.e. how fast the motor should rotate. For a DC motor, this may be a voltage setting the speed or a modulated signal. For an AC motor, a modulated signal is suitable.

The linear actuator may also comprise two end position switches (not shown) that will set the end positions for the piston rod. Most commonly, the end positions are fixed in the linear actuator, and the piston stroke is set by the length of the linear actuator. Alternatively, the end position switches may also be adjustable, so that the piston stroke can be set by the user. The end position switches may be connected to the control unit via two signal control lines, indicating the state of the linear actuator to the control unit. The states are either retracted or extended.

Another way of sensing the state of the linear actuator is to use a current sensing device measuring the current through the motor. When the motor is blocked, i.e. can not rotate, the current consumption of the motor will increase. This signal can be used to detect the state of the linear actuator, i.e. if the motor is blocked when the piston is in the outmost or inmost position. This detection method is suitable when the drive current and the blocking current for the motor differs enough, e.g. by a factor 2 or more.

In one embodiment of the linear actuator, the linear actuator is provided with a rotational sensor 19, detecting the rotations of the motor. The sensor detects the rotation of the motor and outputs a signal representing a rotational value. The sensor may either output an analogue value, e.g. a voltage proportional to the rotational speed of the motor, or a digital value, either a pulsed signal where the number of pulses is proportional to the rotational speed of the motor or a signal representing an absolute value for the rotation of the motor. The absolute value may either represent a value for the angular position over one turn of the motor or may be an absolute value for the position of the piston over the full stroke length. When a sensor is used that outputs the angular position over one turn, the control unit can count the number of turns in order to calculate the position of the piston. When this type of sensor is used, it is preferred to also incorporate a calibration possibility in the linear actuator, in order to be able to calibrate a starting value for the sensor. This may be e.g. an end position switch. During calibration, the piston is driven until the end position switch is reached, and the control unit starts to count from there.

When an absolute output value is used, it may consist of one part giving an absolute value for the angular position over one turn of the motor and one part representing the number of full turns rotated by the motor. In this case, a calibration possibility is not necessary but is still preferable, in order to be able to calibrate a starting value for the sensor.

The sensor is preferably a contactless rotational sensor, e.g. an optical or magnetic sensor, but also other types of sensors are possible to use, depending on e.g. required resolution, life time expectancy or cost.

Figure 2:
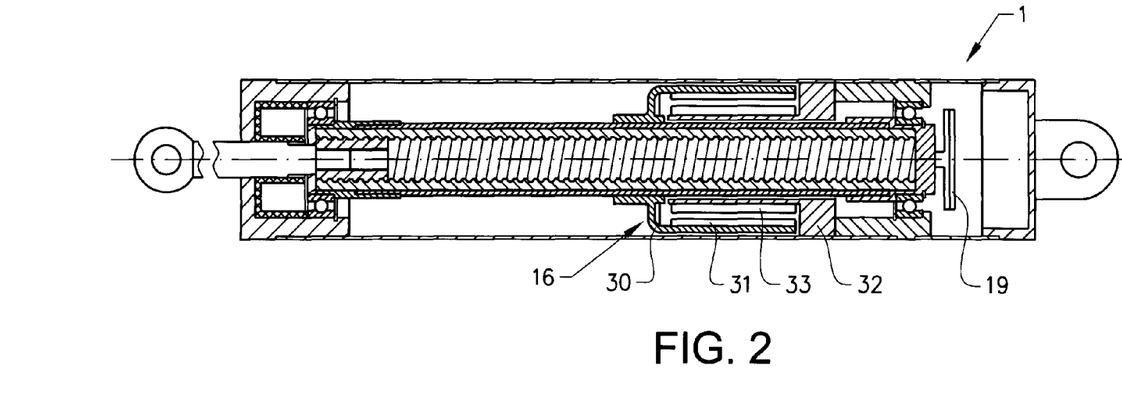
FIG. 2 shows a second embodiment in cut view of a linear actuator according to the invention.

In a second embodiment, shown in FIG. 2, the motor 16 is mounted on the outside of and around the extended nut. In order to obtain as high an output power of the motor as possible, a motor of the outer runner motor type is preferred. In an outer runner motor, the magnets 31 are positioned at the outer, rotating part 30 of the motor housing. The inner part 32 is fixedly mounted to the housing 2 of the linear actuator. The stator 33 of the motor is mounted on the inner part 32 of the motor. With the stator fixed in the linear actuator housing, the electrical power transfer to the stator coils is simplified. By using this type of motor, a compact linear actuator is achieved, in which the length of the linear actuator device is in the same order of magnitude as the maximum piston stroke, i.e. the length of the motor will not reduce the piston stroke length of the actuator. In this embodiment, a rotational sensor as described above may advantageously also be incorporated.

The internally threaded tube 12 used in the extended nut 7 for the use in the above described linear actuator will now be described in more detail with reference to FIGS. 3 to 8 also.

The extended nut 7 comprises an internally threaded tube 12, an outer support sleeve 13, a first end cap 14 and a second end cap 15. The internally threaded tube 12 consists of a plurality of tube segments 40. In a first embodiment, shown in FIG. 3, the internally threaded tube 12 consists of two segments 40. In this embodiment, each segment represents half a tubular element with an internal thread. When the two segments are mounted to each other, an extended nut with an internal thread is obtained. The segments are provided with one or more positioning means 41 that are adapted to interact with one or more positioning recesses 42. Preferably, the two segments are designed in such a way that they are identical and can thus be produced in the same tool. The positioning means and the positioning recesses are in one embodiment adapted to lock the segments axially. In this embodiment, the support tube will lock the internally threaded tube radially. In another embodiment, the positioning means and the positioning recesses may also comprise locking means to lock the internally threaded tube in a radial manner. In this way, the support tube may be superfluous. It is also possible to lock the segments together by means of glue or welding, e.g. ultrasonic welding.

Figure 3:
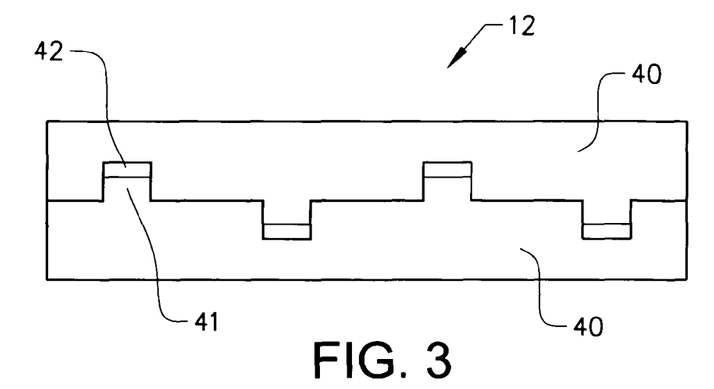
FIG. 3 shows a first embodiment of an internally threaded tube to be used in the linear actuator according to the invention.

The segments are preferably made of a plastic material. The plastic material is chosen to meet the requirements of the linear actuator. These requirements may include wear, friction, cost etc. The segments are preferably manufactured in an injection moulding process. By manufacturing the internally threaded tube in two halves and then mounting them together, an internally threaded tube is provided that is cheap and easy to manufacture. This allows for a linear actuator of the type described above. It is also possible to manufacture the segments in a metal alloy, such as bronze, if very high loads are specified. Such an alloy may be self-lubricating.

In some types of conventional linear actuators, using a lead screw, a plastic nut is used to run on an externally threaded metallic screw. In such a solution, the wear of the nut will be high since the nut will wear over the whole range of the screw. Since this type of lead screw is open, it may not be permanently lubricated, but will have to be lubricated at regular intervals.

In the inventive solution, the wear of the extended nut will be reduced since the screw, made of a metal, will travel over the whole range but will only engage with each part of the internally threaded tube for part of the travel.

Figure 4:
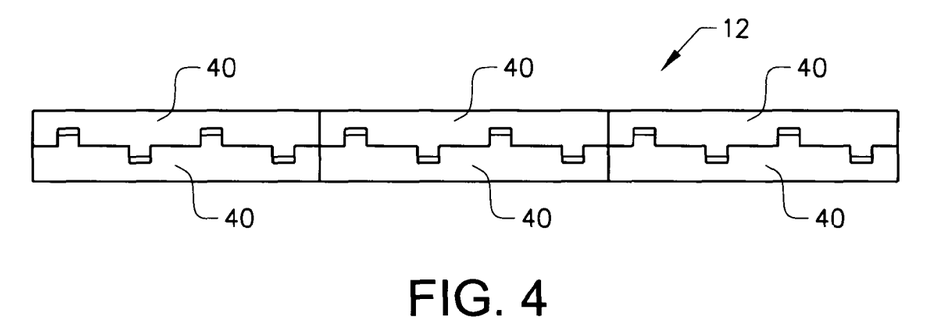
FIG. 4 shows a second embodiment of an internally threaded tube to be used in the linear actuator according to the invention.

In a second embodiment, shown in FIG. 4, the internally threaded tube 12 comprises more than two segments 40. In this embodiment, two segments are assembled to form a first tubular element as described in the first embodiment. The first tubular element is then mounted to a second tubular element, which may be mounted to a third tubular element etc. The internally threaded tube will thus consist of a plurality of such two-segment tubes. In this embodiment, the segments may further comprise positioning means at the end portions 38 of the segments, in order to lock the segments also in the longitudinal direction. In the shown embodiment, the internally threaded tube consists of six segments. In this way, internally threaded tubes of different lengths can be provided for in an easy and cost effective way, which in turn allows for linear actuator of different length in an equally cost effective way. By providing a segment in a standardised spacing dimension, e.g. with a length of 50 or 100 mm, a large number of linear actuators can be produced with only one type of segment.

Figure 5:
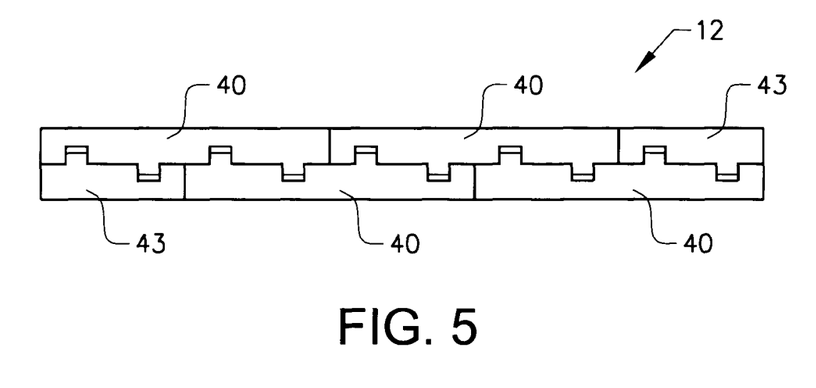
FIG. 5 shows a third embodiment of an internally threaded tube to be used in the linear actuator according to the invention.

In a third embodiment, shown in FIG. 5, the internally threaded tube 12 comprises a number of segments 40. In this embodiment, the segments are mounted with a longitudinal displacement so that the end portion 38 of one segment is positioned at a mid portion 37 of another segment. The displacement is preferably approximately half of the length of a segment. In this way, an internally threaded tube of any desired length can be assembled from only one type of segment. Since the segments are provided with positioning means along the longitudinal edges of the segments, the internally threaded tube will be locked in a longitudinal way, thus there is no need to provide positioning means in the end portions of the segments. This will simplify the tooling for the segment, which in turn will reduce cost and simplify the assembly of the internally threaded tube. With this type of displaced mounting of the segments, there will be two half-segment spaces left when the required number of segments is mounted. In these half-segment spaces, an end segment 43 with half the length of a segment 40 can be mounted. Such an end segment 43 can be obtained either by dividing a segment 40 in half, e.g. by sawing, or by manufacturing a special end segment 43.

It is also possible to mount segments 40 together in order to form a very long internally threaded tube and then to cut, e.g. by sawing, this long internally threaded tube into internally threaded tubes of any desired length.

Figure 6:
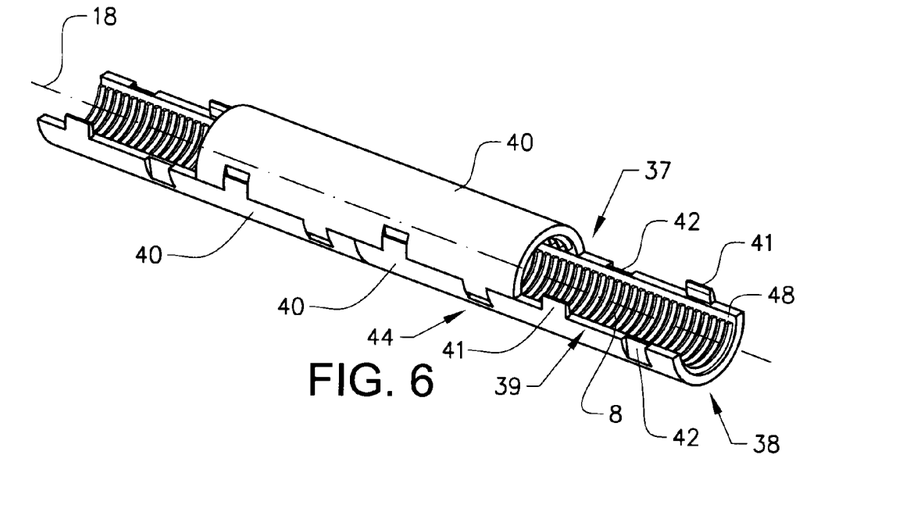
FIG. 6 shows a segment to be used in a tube according to FIGS. 3 to 5.

A segment 40 is shown in detail in FIG. 6. The segment comprises an outer surface 44 and an internal thread 8. The segment is a longitudinal element, resembling in one embodiment a tube cut in half along a centre axis of the tube. When two such segments are mounted together, a tube with an internal thread will be obtained. In this embodiment, each segment forms a semi-circular sector of 180 degrees. A segment is provided with one or more positioning means 41 along each longitudinal edge 39 of the segment and with one or more positioning recesses 42 along each longitudinal edge 39 of the segment. The positioning means and the positioning recesses are preferably arranged in such a way that the segments can be mounted together with a relative longitudinal displacement, as described above. The internal thread is made in such a way that the thread will form a continuous thread when two or more segments are mounted together, end to end. The thread closest to the end portion of a segment will thus be half, in order to allow for the transition of the thread from one segment to the other.

The internally threaded tube is inserted into a support sleeve 13 when it is assembled. The purpose of the support sleeve is to support the internally threaded tube in the radial direction, so that it will not be pushed apart. The support sleeve should therefore be strong enough to hold the internally threaded tube together for at least the rated load of the linear actuator. Thus, the support sleeve is preferably made of a metallic material or a reinforced composite material. It is also possible to incorporate locking means in a segment that is strong enough to hold the segments together without a support sleeve. Another way of locking the segments together would be to use e.g. glue or a welding process.

Figure 7:
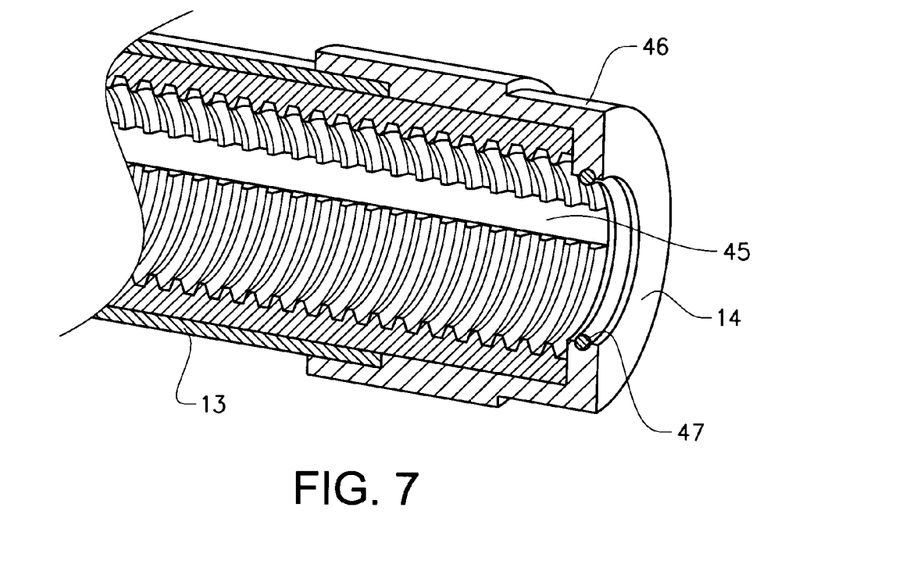
FIG. 7 shows a detail of an end portion of the extended nut to be used in the linear actuator according to the invention.

A detail is shown in FIG. 7 of a preferred embodiment, especially advantageous for the use with an externally threaded friction screw, where the internally threaded tube comprises a longitudinal groove 45 along the entire length of the internally threaded tube. The purpose of the longitudinal groove is to prevent pressure build up in the thread when the screw is run inside the internally threaded tube. A pressure build up may cause the screw to run with more resistance, which may affect the function of the linear actuator in an adverse way. A possible pressure build up is likely to occur especially when the extended nut is provided with sealing means in order to seal of the extended nut. By sealing the extended nut, it will be possible to apply a lubricant, e.g. oil or grease, in the internally threaded tube. This will allow for a permanently lubricated linear actuator. With a sealed extended nut, the longitudinal groove will allow the lubrication to move from one end of the internally threaded tube to the other when the piston and thus the screw is extended or retracted. Otherwise, the lubrication would be pushed to one end of the internally threaded tube with an increased pressure build up and consequent damage to the linear actuator. When the linear actuator is provided with a ball or a roller screw, the longitudinal groove is not required, or should at least be small enough to enable the balls or rollers to move freely.

The longitudinal groove 45 is preferably provided by an elongated recess 48 in the thread at each longitudinal edge 39 of the segment. The elongated recesses will form two grooves in the internally threaded tube when the segments are mounted together. By placing an elongated recess at each longitudinal edge of the segment will also allow for the use of a simplified moulding tool, since the clearance angle for the moulding tool can be optimised.

In a further embodiment, the tube may also be divided in other numbers, e.g. in three, four or more arcuate elements. Thus, a segment may form an arcuate element of e.g. 120 degrees or 90 degrees. In terms of ease and speed of production, it is advantageous if an internally threaded tube according to the invention is assembled from segments with the same angle of curvature. However, the invention also allows for the circumference of the tube to be formed from dissimilar arcuate elements, for example, a first segment with an angle of curvature of 120 degrees and a second segment with an angle of curvature of 240 degrees. Thus, the segmented tube 12 preferably has a circular cross-section.

In FIG. 7, an end cap is shown. Here, the illustrated end cap is the first end cap 14. The first end cap 14 may be identical to the second end cap 15, or they may differ e.g. depending on the mounting of the extended nut. An end cap is mounted on each end of the internally threaded tube. The end cap extends over the support sleeve and displays a bearing surface 46, on which the front bearing 10 will be mounted. The end cap may also comprise a seal 47, e.g. in the form of an O-ring or a specifically manufactured sealing element, in order to seal against the piston 9. The second end cap 15 may comprise a sealing element to seal against the motor when the motor is mounted at the end of the extended nut, or may be closed when the motor is mounted around the extended nut. By providing a seal at the first end cap 14, sealing against the piston, and a seal or a closed section at the second end cap 15, depending on motor type used, the interior of the extended nut will form a closed space. This allows for the use of a permanently lubricated screw and internal nut, which will reduce wear, extend life and reduce friction of the linear actuator.

Figure 8:
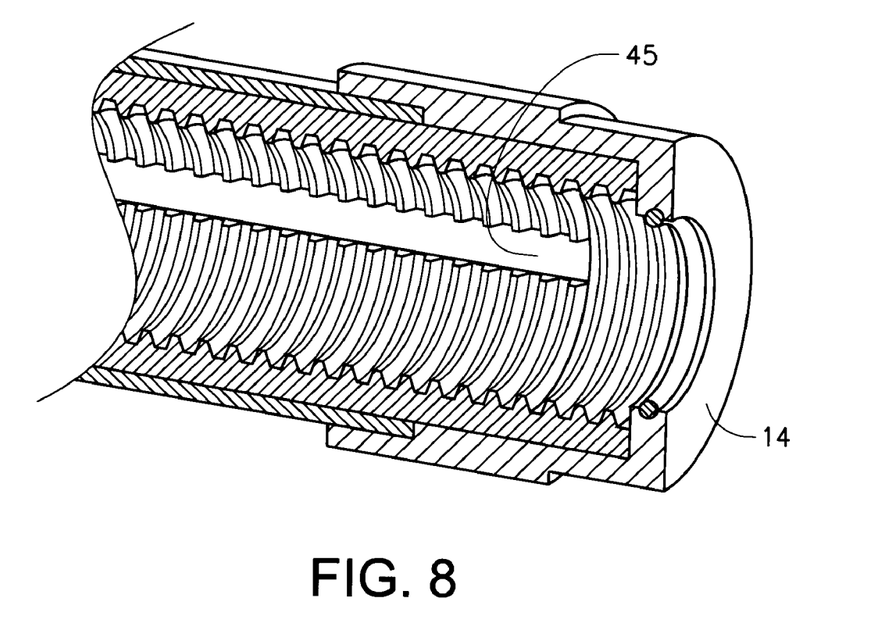
FIG. 8 shows a detail of another embodiment of the end portion of the extended nut to be used in the linear actuator according to the invention.

In a further embodiment, shown in FIG. 8, the longitudinal groove 45 does not extend over the entire length of the thread. In this embodiment, the longitudinal groove is replaced with a short section of thread. By providing a short section of thread in the end region of the extended nut, a small pressure build up is obtained at the end section when the screw enters the end section. This small pressure build up can be used as a soft end stop. The pressure build up can e.g. be detected by a current detection means in the control unit and can in this case replace an end position switch. The pressure build up can also be used as a brake function when the piston runs fast in order to prevent damage when an end position is reached. By selecting the dimensions for the short section of thread, the brake function can be predetermined.

In a further embodiment, it is also possible to provide an external longitudinal groove (not shown) in the outer surface of the segments. Such a groove will, when the extended nut is inserted into the support sleeve, form a channel in the extended nut that can replace the internal longitudinal groove. This may be advantageous when an internal thread with no longitudinal groove is required, e.g. when a ball or roller screw is to be used. When such a thread is used, a connection channel between the thread and the external longitudinal groove is required. The position of this connection channel can be selected in order to provide the same effect as the short section of thread as described above. By placing the connection channel at a short distance from the end of the thread, a braking function can be obtained. With the connection channel at the end of the thread, no pressure build up is obtained.

The invention is not to be regarded as being limited to the embodiments described above, a number of additional variants and modifications being possible within the scope of the subsequent patent claims.

REFERENCE SIGNS

1: Linear actuator device
2: Housing
3: Front end part
4: Rear end part
5: Screw
6: External screw thread
7: Extended nut
8: Internal thread
9: Piston rod
10: Front bearing
11: Rear bearing
12: Threaded tube
13: Support sleeve
14: First end cap
15: Second end cap
16: Motor
17: Rear attachment means
18: Centre axis
19: Rotational sensor
20: Front attachment means 30: Outer part
31: Magnets
32: Inner part
33: Stator
37: Mid portion
38: End portion
39: Longitudinal edge
40: Segment
41: Positioning means
42: Positioning recess
43: End segment
44: Outer surface
45: Longitudinal groove
46: Bearing surface
47: Sealing element
48: Elongated recess

The invention claimed is:

1. An internally threaded tube comprising a plurality of longitudinal segments each having internal threads, two longitudinal edges extending generally parallel to a central axis of the internally threaded tube, a radius of curvature about the axis, and an angle of curvature of less than 360 degrees, the radius of curvature of each segment being substantially identical to the radius of each other segment, the internally threaded tube being formed by coupling at least two segments along the longitudinal edges, and wherein
said plurality of segments are assembled such that each segment is longitudinally displaced along the central axis with respect to at least one other segment.

2. The internally threaded tube according to claim 1, wherein the internally threaded tube includes a plurality of substantially identical segments.

3. The internally threaded tube according to claim 1, wherein the plurality of segments are arranged such that the longitudinal edge at an end portion of one of the segments is positioned against the longitudinal edge at a mid portion of another one of the segments.

4. The internally threaded tube according to claim 1, wherein each segment includes positioning means and at least one positioning recess configured to receive the positioning means of another one of the segments.

5. The internally threaded tube according to claim 1, wherein the segments are injection moulded from a plastic material.

6. The internally threaded tube according to claim 1, wherein each segment includes an elongated recess in the thread along each longitudinal edge.

7. A segment of a threaded tube, the tube segment comprising an arcuate portion having two longitudinal edges extending parallel to a central axis of the tube and an angle of curvature with respect to the axis of less than 360 degrees, a plurality of radial grooves being provided on a radially inner surface of the arcuate portion so as to form a part of the internal thread of the tube, the grooves being adapted to connect with corresponding grooves on at least one other segment with an identical radius of curvature such that a complete internal thread is formed when the at least two segments are assembled about the central axis to form the tube, and wherein
said plurality of segments are assembled such that each segment is longitudinally displaced along the central axis with respect to at least one other segment.

8. The tube segment according to claim 7, wherein the segment is provided with positioning means and at least one positioning recess.

9. A linear actuator device, comprising:
a housing,
an externally threaded screw,
a piston, and
an internally threaded extended nut including an internally threaded tube having a central axis and being formed of a plurality of longitudinal segments, each segment having internal threads, two longitudinal edges extending generally parallel to the central axis, a radius of curvature about the axis, and an angle of curvature of less than 360 degrees, the radius of curvature of each segment being substantially identical to the radius of each other segment, the internally threaded tube being formed by coupling at least two segments along the longitudinal edges, and wherein
said plurality of segments are assembled such that each segment is longitudinally displaced along the central axis with respect to at least one other segment.

10. The linear actuator device according to claim 9, wherein the extended nut further includes a supporting sleeve.

11. The linear actuator device according to claim 1, wherein the extended nut includes an end cap at each end of the internally threaded tube.

12. The linear actuator device according to claim 11, wherein each end cap includes a sealing means.

13. The linear actuator device according to claim 11 wherein each end cap is mounted in bearing means supported in the housing.

14. The linear actuator device according to claim 9, wherein the internally threaded tube has at least one internal longitudinal groove extending into the thread.

15. The linear actuator device according to claim 14, wherein the internally threaded tube has a length along the axis and the internal longitudinal groove extends along substantially the entire length of the internally threaded tube.

16. The linear actuator device according to claim 9, wherein the internally threaded tube includes at least one external longitudinal groove and an opening connecting the external groove to the inside of the internally threaded tube.

17. The linear actuator device according to claim 9, wherein the extended nut is connected to an electrical motor.

18. The linear actuator device according to claim 17, wherein the electrical motor is integrated with the extended nut.

19. The linear actuator device according to claim 17 further comprising a rotational sensor adapted to measure the rotation of the extended nut.

20. A method of producing an internally threaded tube with a central axis, comprising the step of assembling a plurality of longitudinal segments each having an internal thread and two longitudinal edges extending generally parallel to the central axis, each segment providing an arcuate portion of the tube, and the segments being assembled so that each longitudinal edge of each segment is disposed against a separate one of the edges of another one of the segments so as to form a tube with a circular cross-section, and wherein
the segments are assembled such that each segment is displaced longitudinally along the central axis with respect to at least one other segment.

21. The method according to claim 20, wherein the segments are identical.

22. The method according to claim 20, wherein the longitudinal displacement equals substantially half of the length of a segment.

23. The method according to claim 20, wherein the method further comprises the step of assembling an end segment to the plurality of segments.

* * * * *